United States Patent [19]
Jankowiak

[11] 3,814,903
[45] June 4, 1974

[54] AUTOMATIC SINE-COSINE TRIGONOMETER

[76] Inventor: Joseph Edward Jankowiak, 2910 Culver Rd., Rochester, N.Y. 14622

[22] Filed: Aug. 20, 1973

[21] Appl. No.: 390,036

[52] U.S. Cl............ 235/61 GM, 33/76 V, 33/174 S, 35/34
[51] Int. Cl........................ G09b 23/04, G06g 1/00
[58] Field of Search......... 235/61 GM; 33/76 V, 94, 33/102, 174 S, 174 TC; 35/34

[56] References Cited
UNITED STATES PATENTS

| 570,157 | 10/1896 | Edmiston...................... 235/61 GM |
| 1,778,037 | 10/1930 | Okey............................ 235/61 GM |
| 2,947,473 | 8/1960 | Silverberg et al.............. 235/61 GM |
| 3,556,397 | 1/1971 | Andersen...................... 235/61 GM |

FOREIGN PATENTS OR APPLICATIONS

| 170,417 | 10/1921 | Great Britain.................... 33/76 V |

Primary Examiner—Stephen J. Tomsky
Attorney, Agent, or Firm—Cumpston, Shaw & Stephens

[57] ABSTRACT

A trigonometer uses a protractor and a pointer arm pivoted to a selected angle on a protractor. An idler arm pivots in parallel with the pointer arm and is joined to the pointer arm by a connector arm. A sine bar is supported in mounts on the pointer arm and idler arm, slidable relative to the sine bar and a cosine bar perpendicular to the sine bar is connected to the sign bar and slidably supported in fixed mounts. A cosine scale indicates the cosine of the angle of the pointer arm as the position of the cosine bar relative to one of its support mounts, and a sine scale indicates the sine of the angle of the pointer arm as the position of one of the sine bar support mounts relative to the sine bar. Hence, the inventive automatic sine-cosine Trigonometer is an instrument for measuring the sine and cosine in thousands of an inch of any angle from 0° to 45° automatically.

10 Claims, 2 Drawing Figures

3,814,903

AUTOMATIC SINE-COSINE TRIGONOMETER

THE INVENTIVE IMPROVEMENT

The invention arises from many years of experience in tool and die work and a realization that tool and die workers, machinists, and others, need a simple, compact, accurate, and reliable trigonometer for trignometric functions. The invention proposes such a trigonometer for sine and cosine functions and aims at a tool suitable for use in machine shops for tool and die and other precision work.

A SUMMARY OF THE INVENTION

The inventive trigonometer uses a protractor and a pointer arm pivoted at the center of the protractor through angles from 0° to 45° and means for setting the pointer arm at a desired angle. An idler arm has a pivot point spaced a predetermined distance from the center of the protractor, and a connector arm joins the pivot arm and the idler arm for pivoting parallel with each other, the connector arm being at equal distances from the pivot points for the pointer arm and the idler arm. A cosine bar is slidably supported between a pair of fixed mounts to be parallel with the pointer arm when the pointer arm is set at the 0° angle on the protractor, and a sine bar is joined to the cosine bar and perpendicular to the cosine bar. The sine bar is supported between a pair of mounts at the intersections of the connector arm with the pointer arm and idler arm, and the sine bar mounts are slidable relative to the sine bar. A cosine scale indicates the cosine of the angle of the pointer arm as the position of the cosine bar relative to one of the cosine bar support mounts, and a sine scale indicates the sine of the angle of the pointer arm as the position of one of the sine bar support mounts relative to the sine bar.

DETAILED DESCRIPTION

Figure 1:
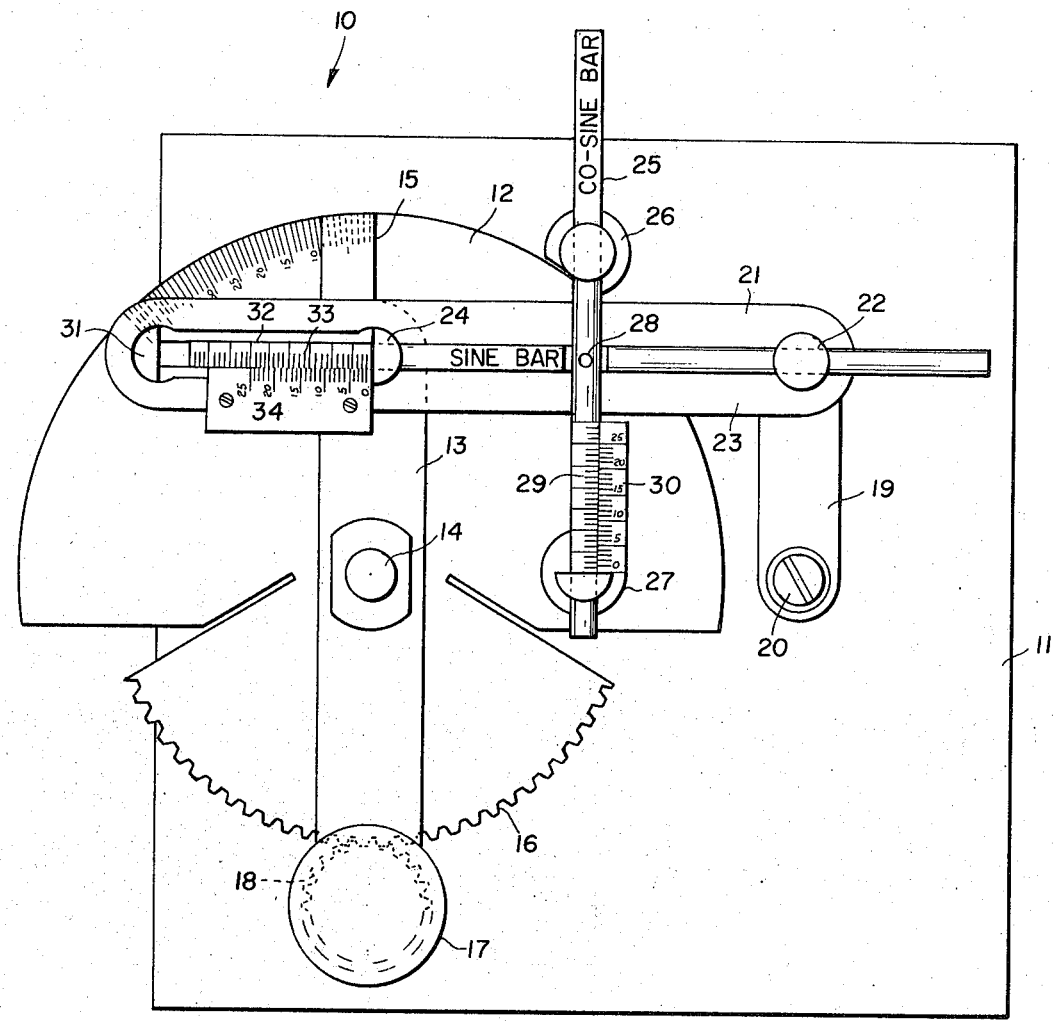
FIG. 1 is a plan view of a preferred embodiment of the inventive trigonometer with the pointer arm set at the 0° angle.

Trigonometer 10 is built on a base plate 11 and includes a fixed protractor 12 having at least a 0° to 45° sector as illustrated. A pointer arm 13 is mounted on a pivot 14 at the center of protractor 12 so that the edge 15 of pointer arm 13 moves over protractor 12 to indicate angles at least from the 0° angle to the 45° angle. A knob 17 is rotatably mounted on pointer arm 13 and carries a gear 18 meshed with a fixed gear sector 16 so that the position of pointer arm 13 can be set by turning knob 17 to move gear 18 along gear 16.

An idler arm 19 is mounted on a pivot 20 fixed to base 11 and spaced a predetermined distance from pivot 14, and a connector arm 21 joins idler arm 19 to pointer arm 13 for pivoting in parallel with each other. The intersections of connector arm 21 with pointer arm 13 and idler arm 19 are equally spaced respectively from pivots 14 and 20 so that connector arm 21 is on an equal radius on pointer arm 13 and idler 19 for the desired parallel pivoting of arms 13 and 19.

The connection between connector arm 21 and idler arm 19 is made by a pin 22 that extends above arms 19 and 21 and has a through bore receiving sine bar 23. A similar pin 24 connects pointer arm 13 to connector arm 21 and has a through opening receiving sine bar 23. Pins 22 and 24 are free to pivot relative to pointer arm 13 and idler arm 19, and are free to slide axially relative to sine bar 23. Cosine bar 25 is slidably supported in mounts 26 and 27 fixed to base 11, and cosine bar 25 and sine bar 23 are preferably half-lapped and jointed together by a pin 28. Cosine bar 25 and sine bar 23 are perpendicular to each other, and cosine bar 25 is parallel with pointer arm 13 at the 0° position of FIG. 1.

Figure 2:
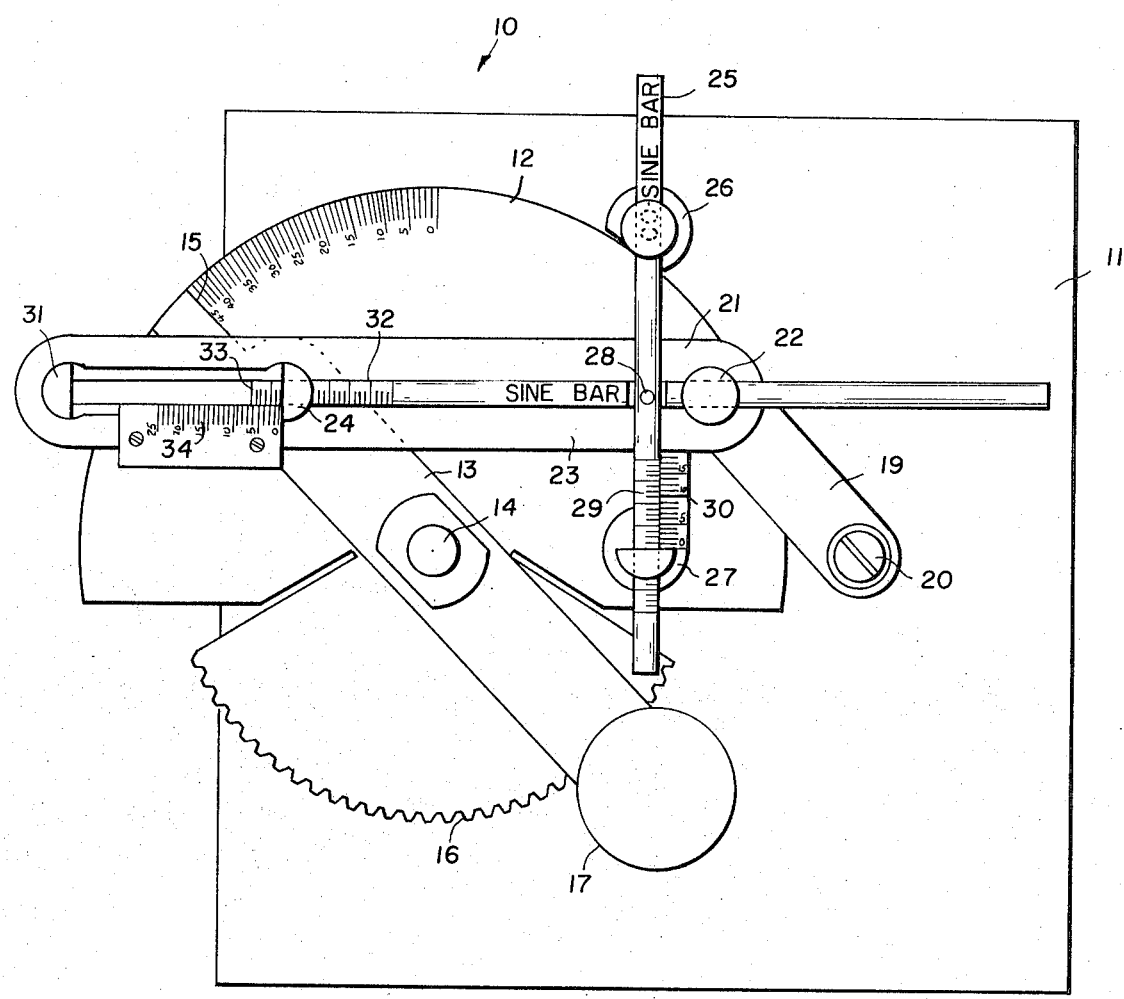
FIG. 2 is a plan view of the trigonometer of FIG. 1 with the pointer arm set at the 45° angle.

Cosine bar 25 has a scale 29 marked out relative to mount 27 and used in cooperation with an adjacent vernier 30 fixed in place relative to base 11 and mount 27. As pointer arm 13 moves between the positions of FIGS. 1 and 2, cosine bar 25 moves relative to mount 27 so that scale 29 can be read with the aid of vernier 30 to indicate the cosine of any desired angle.

Sine bar 23 extends beyond pin 24 to a pin 31 carried on connector arm 21 and moves in a channel in a fixed bar 32 between pins 24 and 31. The portion of sine bar 23 moving between pins 24 and 31 is preferably flattened and provided with a scale 33 that is read in cooperation with a vernier 34 to determine the position of support pin 24 relative to sine bar 23 throughout the angles from 0° to 45° to indicate the sine of any selected angle.

In operation, as pointer arm 13 is pivoted to a desired angle, pin 24 slides along sine bar 23 to indicate the sine of the selected angle on scale 33, and this sets the distance of sine bar 23 and cosine bar 25 relative to pivot 14, and hence determines the relationship of scale 29 to pin 27 to indicate the cosine of the selected angle. Instead of using trignometric function tables or other devices, the user then merely turns knobs 17 to select the desired angle and then reads the sine and cosine directly from scales 33 and 29.

The inventive trigonometer can be made in many sizes and proportions, but a 1 inch spacing between pivot 14, and the axis of sine bar 23, between pivot 14 and mount 27, between mount 27 and pivot 20, and between pivot 20 and pin 22, is preferred. This allows scales 33 and 29 to be set out as fractions of an inch, and also allows readings to be taken directly from calculator 10 by means of a micrometer. The spacing and operation of various levers and pivots can be varied however, so long as the basic movement of sine bar 23 and cosine bar 25 is preserved.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the materials, movements, proportions, scales and construction design for making the inventive trigonometer in various forms.

I claim:

1. A trigonometer comprising:
   a. a protractor;
   b. a pointer arm pivoted at the center of said protractor through angles from 0° to 45°;
   c. means for setting said pointer arm to a desired angle;

d. an idler arm having a pivot point spaced a predetermined distance from said center of said protractor;

e. a connector arm joining said pointer arm and said idler arm for pivoting in parallel with each other, said connector arm being at equal distances from the pivot points for said pointer arm and said idler arm;

f. a cosine bar slidably supported between a pair of fixed mounts to be parallel with said pointer arm when said pointer arm is set at the 0° angle on said protractor;

g. a sine bar joined to said cosine bar and perpendicular to said cosine bar, said sine bar being supported between a pair of mounts arranged at the intersections of said connector arm with said pointer arm and said idler arm, said sine bar mounts being slidable relative to said sine bar;

h. a cosine scale for indicating the cosine of the angle of said pointer arm as the position of said cosine bar relative to one of said support mounts for said cosine bar; and i. a sine scale for indicating the sine of the angle of said pointer arm as the position of one of said sine bar support mounts relative to said sine bar.

2. The trigonometer of claim 1 including a knob and gear for setting the angular position of said pointer arm.

3. The trigonometer of claim 1 wherein said sine bar and cosine bar are half-lapped and pinned together.

4. The trigonometer of claim 1 wherein said cosine bar is arranged between said pointer arm and said idler arm.

5. The trigonometer of claim 1 wherein said sine scale is arranged between said sine bar and the one of said sine bar support mounts joining said pointer arm and said connector arm.

6. The trigonometer of claim 1 including verniers cooperating with said sine and cosine scales.

7. The trigonometer of claim 6 including a knob and gear for setting the angular position of said pointer arm.

8. The trigonometer of claim 7 wherein said cosine bar is arranged between said pointer arm and said idler arm.

9. The trigonometer of claim 8 wherein said sine bar and cosine bar are half-lapped and pinned together.

10. The trigonometer of claim 9 wherein said sine scale is arranged between said sine bar and the one of said sine bar support mounts joining said pointer arm and said connector arm.

* * * * *